Patented Jan. 20, 1942

2,270,674

UNITED STATES PATENT OFFICE 2,270,674

METHOD OF SEPARATING HIGH MOLECULAR MIXTURES

Stanislaw Pilat and Marian Godlewicz, Lemberg, Poland, assignors to Shell Development Company, San Francisco, Calif., a corporation of Delaware No Drawing. Application April 25, 1936, Serial No. 76,466. In Poland February 6, 1933

18 Claims. (Cl. 196—13)

This invention pertains to a method of separating mixtures of high molecular substances into two or more fractions having different chemical and/or physical properties, and is a continuation-in-part of our application Serial No. 708,988 filed January 30, 1934, and of our application Serial No. 62,294, filed February 4, 1936, the latter having issued as Patent No. 2,188,012, dated January 23, 1940.

Industrial materials which contain complex mixtures of organic or inorganic compounds may be separated into desirable fractions containing concentrates of one or more pure substances, or of one or more groups of substances which have similar physical properties and/or chemical compositions by many known methods, such as distillation, crystallization, treatment with selective solvents, adsorption, etc.

The known processes for effecting these separations have many limitations. For example, distillation methods often result in a decomposition of the materials being treated, and, moreover, are ineffective to separate substances having the same or almost the same vapor pressures; the degree of separation effected by crystallization methods and selective solvent extraction methods is such, that the products must often be further treated to obtain products of the desired purity; and considerable losses are often involved in the use of adsorption methods.

According to the present invention we provide a new and convenient method of separating high molecular mixtures into portions of different properties by means of a low molecular substance or mixture of low molecular substances, preferably inert under the conditions of the treatment, herein designated as a gaseous treating agent. Other objects of our invention will be apparent from a reading of the following specification.

Our invention may, for example, be applied to the separation of liquid or meltable high molecular mixtures, or high molecular mixtures which may be brought into solution by the use of suitable solvents, such as crude mineral oils, their distillates or residues, mineral oil fractions obtained by extraction of petroleum oils, shale oils, and other hydrocarbon and non-hydrocarbon mixtures, like coal tar, coal tar oils, animal and vegetable oils, such as neat's foot oil, linseed oil, rapeseed oil, volatilized rapeseed oil and other mixtures of fatty acids, esters, phenols, alcohols, organic nitrogen-containing substances, chlor-derivatives, pharmaceutical preparations, preparations obtained from living organisms, such as, for example, hormones, and many other chemicals. The process may be applied to separate mixtures of different chemical classes of substances, or to free materials from impurities, or to separate members of homologous or analogous chemical groups. Thus, hydrocarbons may be separated from mixtures of hydrocarbons and the above non-hydrocarbons.

Our process is based upon our discovery that high molecular mixtures can be separated into portions containing substances of different molecular weights and/or chemical structure, by treating the mixture, while in the liquid state, under superatmospheric pressure with a low molecular substance under conditions which cause a lowering in the density of the mixture, thereby causing the mixture to "demix," i. e., to separate into two or more phases of different densities, of which the lighter phase is liquid and contains the greater part of the low molecular substance, and the heavier phase may be liquid, or semi-solid. As applied to the phases produced as a result of this demixing, the term "liquid" is used to designate a fluid phase having a density greater than the critical density of the low molecular substance. The expression "liquid state" as applied to the high molecular mixture being separated is intended to include the pure mixture in its liquid state, as well as a solution of such a mixture in a suitable liquid solvent. The light and heavy phases produced in this manner may be separated by settling and decantation, or by centrifuging, or in some other manner, without changing their compositions, and then separately treated to remove the gas and solvents from the high molecular substance.

The temperature of the treatment is preferably, but not necessarily, in the vicinity of the critical temperature of the low molecular treating agent, or somewhat above this temperature. Temperatures in the vicinity of the critical temperature, or above this temperature, are in the present specification referred to as "para-critical" temperatures. The lowest temperature at which a low molecular substance may be regarded as being in the para-critical state, i. e., the lower limit of the useful operating temperature range, will depend upon the nature of the low molecular substance, but generally lies between the critical temperature and the temperature of maximum solubility, i. e., the temperature above which a rise in the temperature of the low molecular substance in the liquid state under its own vapor pressure is accompanied by a decrease in its solvent power for the high molecular material. In general, substances are said to be in the para-critical state when their temperature is not more than about 30° C. to 60° C. below the critical temperature, or is above the critical temperature, although these specific limits are not rigid, and may in certain cases be exceeded. While temperatures below the critical may be employed, and pressures may in certain cases be sufficiently high to condense the gaseous treating agent, we prefer, when operating at these lower temperatures, to employ pressures which are low enough to prevent the liquefaction of the low molecular treating agent, it being in this case, of course, requisite that the low molecular substance be sufficiently soluble in the high molecular mixture to be dissolved therein at the stated pressure in sufficient quantity to cause the desired precipitation of the components of higher internal pressures. This solubility may often be increased by the use of suitable solvents.

It will be noted, therefore, that the low molecular treating agent may be employed either in the vaporous or truly gaseous state. In the present specification and claims, the expression "gaseous" is intended to be generic to both of these states.

Summarizing, the treatment with the low molecular gaseous treating agent, which process is hereinafter for convenience referred to as "gas fractionation," consists in separating a high molecular mixture by treating it with a low molecular treating agent, either under such conditions of temperature and pressure as determine the gaseous state of the agent, or under para-critical conditions, i. e., under conditions under which the agent may be liquefied but its solvent power for the high molecular mixture decreases with a rise in temperature.

The compositions of the fractions produced by operating under these conditions is different from those which are obtained by employing a liquid, low molecular substance at a lower temperature, or a gaseous treating agent at normal pressure. For example, it is known to precipitate asphalts or solid paraffin wax from hydrocarbon oils by dissolving the oil in liquid propane. This may be effected at temperatures lower than 60° C.; but unless the temperature is substantially above this point, propane will not normally and by itself, cause a separation between paraffinic and aromatic hydrocarbons in the manner achieved by the process of this invention, such separation may be effected by employing propane under the conditions of our process, the non-paraffinic hydrocarbons being precipitated in the denser phase, substantially free from propane, and the paraffinic hydrocarbons being in the lighter liquid phase.

As hereinafter described, we may carry out our process by dissolving the initial mixture in a liquid or liquefied solvent which is below its para-critical temperature, said solvent being added to the initial mixture separately, or together with the gaseous treating agent. This form of the process should be distinguished from the known deasphalting treatments in which propane or a similar solvent, such as naphtha, are employed in the liquid state. In these treatments the solvents, being below their para-critical temperatures, are incapable of separating the oil into liquid phases of the character obtained by the present invention. While these solvents often may contain small amounts of methane or ethane which under the conditions of the treatment may be in the para-critical state, their concentration in the oil is too small to cause the separation of the oil into two liquid phases. In our process we employ a sufficient concentration of the gaseous treating agent in the para-critical state to cause the desired formation of two or more simultaneous liquid phases in equilibrium with one another. We have found that the gaseous treating agent is particularly effective when present in the system being separated into liquid phases in amount equal to at least one part by weight of gaseous treating agent in the para-critical state to four parts, and, preferably, three parts by weight of the low-boiling liquid solvent.

The gas fractionation described herein should, moreover, be distinguished from conventional liquid phase extraction processes, in which a selective solvent, like liquid $SO_2$, is contacted with hydrocarbon oil to dissolve the components of high internal pressure, as, for example, aromatic or naphthenic hydrocarbons, which are precipitated in our process. Certain of these processes employ the solvent, such as $SO_2$, in the gaseous state; in these cases, however, the solvents have heretofore been employed at temperatures far below their critical temperatures, and, upon being mixed with the oil, behave in a manner similar to the liquid selective solvents, in that they preferentially dissolve the hydrocarbons which are relatively more polarizable and/or which have high internal pressures, i. e., the aromatic and/or naphthenic hydrocarbons. Thus, in the known processes, increasing the quantity of the gaseous selective solvent has the effect of dissolving additional quantities of these more polarizable substances of high internal pressure in the solvent phase; while in our process, the introduction of larger quantities of the gaseous treating agent causes larger amounts of these same substances to be precipitated from the solvent phase.

Any low molecular substance which is capable of being dissolved in the high molecular mixture being fractionated, or in its solution in a suitable solvent, to cause the lowering of its density and/or its internal pressure to the extent of causing the formation of two liquid phases, may be employed. Since our process is preferably carried out at temperatures in the proximity and above the critical temperatures of the gaseous treating agents, it is necessary to select a substance having a low enough critical temperature so that the temperature of operation is not inconveniently high, will not cause the decomposition of the high molecular substances, and will not be so high as to prevent the formation of two phases, since a rise in temperature generally is accompanied with a corresponding increase in the miscibility of the components of the high molecular mixture. The maximum operative temperature will depend upon the nature of the high molecular mixture as well as upon the properties of the gaseous treating agent. In view of these requirements, we prefer, when treating hydrocarbon oils, to employ low molecular substances having critical temperatures below about 200° C. The preferred group of low molecular substance, therefore, consists of aliphatic hydrocarbons having between one and five carbon atoms in the molecule, such as methane, ethane, ethylene, propane, propylene, acetylene, normal- or iso-butane, etc., although aliphatic substances having as many as eight carbon atoms may in certain cases be employed. Among other gases which may be employed as low molecular treating agents, the following may be mentioned, without, however, restricting the scope of the invention thereto: hydrogen, carbon monoxide, water gas, dry natural gas, natural gas, sulfur dioxide, sulfur trioxide, ammonia, ethyl chloride, dichlor-diflour methane, methylene fluoride, dimethyl ether methyl ethyl ether, dimethyl amine, hydrogen chloride, and rare gases, such as helium. The gaseous treating agent should, preferably, be incapable of reacting chemically with the high molecular substances under the conditions of the treatment, no chemical change being contemplated in the gas fractionation.

As stated above, the hydrocarbons or other non-hydrocarbon high molecular mixture may be gas-fractionated after being dissolved in a suitable solvent, which preferably increases the solubility of the gaseous treating agent in the mixture. These solvents may, for example, be low boiling or liquefied aliphatic hydrocarbons of the type commonly known as deasphalting agents, such as propane, propylene, normal- and iso-butane, butylene, pentanes, pentenes, hexanes, hexenes, and their mixtures, as well as light, straight run naphthas, and other light, preferably aromatic-free fractions of mineral oil, boiling preferably below about 270° C., although even higher boiling distillates may be desirable when treating certain high molecular mixtures.

The solvent may often be employed to effect a preliminary refining. For example, when fractionating a hydrocarbon mixture, and this mixture contains, as most distillation residues do, certain asphaltic or resinous materials, it is preferable in many cases to precipitate these materials by dissolving the oil in a deasphalting agent, separate the precipitate from the oil in solution, and then treat the oil, together with all or a portion of the deasphalting agent with the gaseous treating agent.

Alternatively, or in conjunction with the above hydrocarbon solvents, a solvent from the group of solvents known as selective naphthenic (or aromatic) solvents may be employed. This group comprises, inter alia, liquid sulfur dioxide (at temperatures below para-critical, i. e., below about 100° C.), BB' dichlorethyl ether (Chlorex), cresylic acid, phenol, aniline, furfural, quinoline, as well as alcohols, or ethers, their mixtures, and their solutions in diluents, such as benzol. These polar solvents often are effective to increase the sharpness of the separation. These selective solvents are, moreover, frequently effective to cause the mixture being treated to separate into three isotonic liquid phases instead of into two liquid phases. The formation of more than two liquid phases is often advantageous, for example, in the treatment of mineral oils, when it is desired to produce a fraction containing a concentrate of heavy aromatics, a fraction containing a concentrate of heavy lubricating oil, and a fraction of a light oil. Although any of the above selective solvents may be employed for the simultaneous formation of three liquid phases, we prefer to employ for this purpose those selective solvents which have a high solvent power for oil, and particularly for asphaltic and resinous material. The preferred solvents for this purpose, therefore, are: crude cresol, cresylic acid, octylaldehyde, crotonaldehyde, ethyl cyanide, acrolein, benzaldehyde, nitrobenzol, petroleum nitrogen bases, such as those obtained by neutralization of acid sludge produced in the acid treatment of cracked petroleum distillates, and other nitrogen bases, such as quinoline and pyridine and their substitution derivatives.

The formation of three simultaneous liquid phases can be effected by using a sufficient quantity of the selective solvent, and by operating at a temperature which is sufficiently low. The quantity may be less than that necessary to cause the initial solution to separate into two liquid phases in the absence of the gaseous treating agent, or, if desired, the mixture may initially be present as two liquid phases. In the preferred form of our invention, however, both for the formation of two liquid phases and for the formation of three liquid phases, the selective solvent is present in the oil in such a concentration as substantially to saturate it without causing it to separate into two liquid phases at the temperature used in our treatment, and prior to the introduction of the gaseous treating agent.

Moreover, it is often advantageous to mix the oil to be treated first with an excess of the selective solvent, whereby raffinate and extract phases are formed, separate the extract phase from the raffinate phase, and then treat the resulting raffinate phase according to our process.

The solvent employed should preferably have a higher critical temperature than the gaseous treating agent, so as to be in the liquid state under the conditions of the treatment, although it may be added to the mixture either in the vaporous or liquid state. Thus, when propane is used as the gaseous treating agent, butane or a higher boiling solvent should be employed; and when $SO_2$ is used as a solvent, methane, ethane, ethylene or carbon dioxide is preferably used as a gaseous treating agent, although propane may in certain cases be employed.

Auxiliary treating agents, such as fuller's earth, silica gel, naphthalene, phenanthrene, dinitrobenzene, and the like, may be added to the high molecular mixture, either together with the above solvent, or alone, these agents being particularly desirable when treating dark-colored mixtures, such as residual mineral oils.

The purpose of dissolving the high molecular mixture in the solvent, or of adding adsorbing agents, is to modify the fractionating effect obtained with the gaseous treating agent, and to improve the sharpness of the separation, because we found that the compositions of the fractions obtained by our method of treatment after first dissolving the mixture in a solvent are often more desirable than those obtained from the treatment of undissolved mixtures. A further purpose is to increase the flexibility of the process by increasing the solubility of the gaseous treating agent, thereby extending the temperature and pressure ranges under which the gaseous treating agent is capable of effecting the desired demixing.

Under the conditions of our process, the gaseous treating agent has a low internal pressure, and is effective to lower the density and the internal pressure of the high molecular mixture; as a result those components of the high molecular mixture which have the greatest internal pressures and/or the highest molecular weights are selectively thrown out of the solution containing the other components of the high molecular mixture and the gaseous treating agent. The separation effected may, therefore, be either on the basis of molecular size or chemical structure.

The quantity of the low molecular, gaseous treating agent dissolved under para-critical conditions in the mixture being fractionated determines the quantity of the high molecular substances which are precipitated in the heavier phase; and the quantity of gaseous treating agent dissolved can, in turn, be conveniently controlled by regulating the pressure. It follows that by a suitable choice of operating pressures the size of the lower phase can be varied at will within relatively wide limits.

This circumstance makes it possible to operate our process to separate multi-component mixtures into more than two fractions, by increasing the pressure step-wise, and removing the separated heavy phase after each increase in pressure. For example, after producing primary light phases by forcing a low molecular gas into a mixture at a certain pressure, and separating the phases, the separated lighter liquid phase may be contacted with the same gaseous treating agent at a higher pressure, or with a different gaseous treating agent under a pressure which will cause additional quantities of the gaseous treating agent to be dissolved in the said lighter phase, so as to cause a further decrease in its density and/or its internal pressure. This causes the high molecular substances contained in the primary light phase to demix, and form two secondary liquid phases of different compositions and specific gravities. As in the first treatment, most of the gaseous treating agent will be retained in the secondary lighter liquid phase. By repeating this treatment with successive light liquid phases in a series of steps by using progressively increasing pressures and/or progressively more soluble gaseous treating agents, so as to introduce additional quantities of a gaseous treating agent into the solution at each stage, the high molecular mixture may be fractionated into any desired number of fractions of different properties and compositions. However, instead of introducing additional quantities of a gaseous treating agent into one of the lighter liquid phases (either primary, secondary, or any subsequent one), to lower its density and/or its internal pressure, it is also possible to effect the further fractionation or demixing of one of the lighter liquid phases by suitably varying the pressure and/or the temperature. For example, the pressure may be maintained substantially constant, and the temperature may be changed to cause the desired formation of two liquid phases; or both the pressure and the temperature may be permitted to vary. Any of these methods may be used in a series of separations, or the two methods may alternate in a series of consecutive treatments.

It may be desirable in a series of consecutive treatments not only to vary the treating conditions, like pressure, temperature, and the quantity of the gaseous treating agent, but also to modify the quantity or composition of the solvent in which the high molecular mixture is dissolved, as, for example, by adding more of the solvent or adsorbent material already present in the solution, or by adding a new liquid diluent or a selective naphthenic solvent or adsorption material.

When mixtures, such as petroleum oils, which contain many individual substances, are fractionated in the manner described above, so as to produce three liquid phases, the phases are particularly suitable for further treatment by distillation. Thus, in each phase, the most volatile constituents are the most non-paraffinic, and when such a phase is reduced by distillation its paraffinicity is increased. This is especially true of the two lighter phases, which contain relatively low concentrations of non-paraffinic hydrocarbons. According to one form of our process, e. g. when applied to petroleum residues containing lubricating oils, we separately distill the two lighter phases, and blend the distillation residues after distilling the gaseous treating agent, selective solvent, auxiliary solvent (if employed), and the more volatile non-paraffinic components of these phases, thereby producing a high quality lubricating oil. The heaviest phase may also be distilled, but in most cases it contains a relatively high concentration of aromatic and asphaltic material, rendering it unsuitable for the production of lubricating oils.

While we have, in the foregoing specification, expressed certain theories as to the cause of the separation of the high molecular mixtures, in terms of internal pressures, densities, etc., we do not wish to be limited to any theory expressed herein, but wish to include in the scope of our claims the operative steps disclosed and described.

The invention may be further understood from the following examples, which are not, however, included with a view of restricting the scope of our invention.

EXAMPLE I

A topped crude having a specific gravity of .9565 at 15° C. and an Engler viscosity of 3.03 at 100° C. was dissolved in 10 vols. of a liquid propane-butane fraction. After the separation of the precipitated asphaltic substances, a natural gas consisting substantially of methane and ethane was introduced under a pressure of about 150 atms. into the deasphalted solution, which was maintained at room temperature. Under these conditions a heavy liquid layer containing 17.08% of the original topped crude sample separated out. The oil separated from the lighter liquid phase had a specific gravity of .9325, a good color, and a viscosity index of 37 (609 sec. Say. at 100° F., 58.6 sec. Say. at 210° F.). A duplicate run produced the corresponding oil having a viscosity index of 41. For comparison a vacuum distillate from the same crude and having a specific gravity of .9377 had a viscosity index of 21 (532 sec. Say. at 100° F., 34.9 sec. Say. at 210° F.).

EXAMPLE II

For purposes of comparison with the previous example, a substantially asphalt-free and wax-free residual Potok oil having a specific gravity at 15° C. of .956, a viscosity of 165 sec. Say. at 210° F. was dissolved in 2.95 vol. (based on the volume of the asphalt-free oil) of a solvent consisting of 61% propane, 4% normal butane and 35% iso-butane, and then treated with dry natural gas containing 99% methane, at room temperature, and at the various pressures given in the following table, the heavy phase being removed before each increase in pressure. The results are given below yields being based on the original stock:

Fractionation of Urycz topped crude at room temperature

| Pressure atmospheres | Oil precipitated percent weight | Specific gravity at 15° C. | Viscosity index | Viscosity-gravity constant | Viscosity sec. Say. at 210° F. |
|---|---|---|---|---|---|
| 8 | 8.4 | | | | |
| 30 | 4.9 | 1.019 | | .923 | 5388 |
| 40 | 6.5 | 1.009 | | .920 | 2328 |
| 50 | 7.8 | .981 | | .903 | 493 |
| 60 | 12.6 | .9615 | 23 | .885 | 257 |
| 70 | 13.7 | .9475 | 38 | .873 | 161 |
| 80 | 11.7 | .9365 | 42 | .866 | 141 |
| 90 | 9.4 | .928 | 46 | .860 | 89 |
| 100 | 8.3 | .919 | 49 | .853 | 71 |
| 130 | 11.5 | .9045 | 55 | .843 | 55 |
| * | 4.6 | .886 | | .834 | |

*Residue in the last light phase.

In the above example, the fraction precipitated at 8 atmospheres pressure was very dark colored, was asphaltic in character, and was very viscous. It will be noted that the fractions produced are progressively more paraffinic in character, and have lower viscosities.

EXAMPLE III

One hundred kg. of a residue from a Grabownica crude oil were intimately mixed with 2 kg. of cresol and 370 kg. of technical propane, and the resulting mixture was allowed to stratify, forming a light raffinate phase and a heavy extract phase. The extract phase, which weighed 147 kg., and consisted predominantly of cresol, was drawn off, and distilled; it was found to contain 19 kg. of extracted oil. The remaining homogeneous raffinate phase was saturated with natural gas of the composition employed in Example II, at a pressure of 100 atmospheres, whereupon it separated into three simultaneous liquid phases in equilibrium with one another, which were separately drawn off, and distilled to separate the cresol, propane, and natural gas from the oil. These phases yielded the following products: The heaviest phase yielded 13 kg. of extract; the middle phase, 46 kg. of heavy lubricating oil; and the lightest phase, 22 kg. of light oil.

EXAMPLE IV

Seven hundred grams of wood tar suitable for impregnation, and having a specific gravity of 1.0218 were mixed with 4 liters of propane; 109 grams of tar, having a specific gravity 1.1074, settled out and were separated. The remaining propane solution was then treated with methane at room temperatures and at successively higher pressures, the precipitated heavy phase being removed at each stage. The results were as follows:

| Pressures, atms. | Tar precipitated, grams | Specific gravity at 15° C. | Acid number |
|---|---|---|---|
| 1 | 109 | 1.1074 | -------- |
| 50 | 61 | 1.0718 | 58.4 |
| 70 | 78 | 1.0417 | 26.3 |
| 100 | 186 | 1.0176 | 22.6 |
| 130 | 75 | 1.0059 | 15.3 |
| Residue in solution | | 0.9837 | 10.5 |

EXAMPLE V

One hundred thirty-one grams of bone-fat oil having an acid number of 118 and a saponification number of 191 were dissolved in 387 grams of propane, and the resulting solution was saturated with natural gas at 70 atms., causing 64 grams of oil with an acid number of 103 and a saponification number of 192 to be precipitated. The precipitated oil was removed, and the lighter phase saturated with natural gas at 100 atms. of pressure, causing a further separation of 43 grams of an oil having an acid number of 117 and a saponification number of 196.

In the present specification and claims the term "normal liquid" is used to designate a liquid which is at a temperature lower than para-critical. The expression "mixture" is intended to include true homogeneous solutions as well as liquid systems of several phases.

We claim as our invention:

1. A process for separating a high molecular mixture into portions having different properties, comprising the steps of subjecting said mixture in the normal liquid state to the precipitating action of a quantity of a gaseous treating agent comprising a substance selected from the group consisting of: methane, ethane, and natural gas, under para-critical temperature conditions for said substance at a pressure below the liquefaction pressure of the treating agent at the temperature of the treatment, said quantity being sufficient to cause the formation of at least two liquid phases containing different portions of the mixture and separating said liquid phases at a para-critical temperature for said substance.

2. A process for separating a high molecular mixture comprising organic non-hydrocarbon substances into portions having different properties, comprising the steps of subjecting said mixture in the normal liquid state to the precipitating action of a quantity of a low molecular treating agent which is incapable of reacting chemically with the high molecular mixture under the conditions of the treatment, at a temperature above the critical temperature for the said treating agent, said quantity being sufficient to cause the formation of at least two liquid phases containing different portions of the mixture and separating said liquid phases at a temperature above the critical for said treating agent.

3. A process for separating a high molecular mixture into portions having different properties, comprising the steps of subjecting said mixture in the normal liquid state to the precipitating action of a quantity of a low molecular treating agent which is incapable of reacting chemically with the high molecular mixture under the conditions of the treatment, at a temperature above the critical temperature of the said treating agent, said quantity being sufficient to cause the formation of at least two non-gaseous phases containing different portions of the mixture and separating said non-gaseous phases above said critical temperature.

4. The process according to claim 3 in which the non-gaseous phases are liquid.

5. A process for separating a high molecular mixture into fractions having different properties, comprising the steps of dissolving said mixture in a liquid solvent for said mixture to produce a homogeneous normal liquid solution, dissolving in the resulting liquid solution a quantity of a low molecular gas, said quantity being sufficient to cause the formation of two non-gaseous phases, the pressure being below the liquefaction pressure of said gas at the temperature of the treatment, said gas being incapable of reacting chemically with the high molecular mixture under the conditions of the treatment and separating said non-gaseous phases at a pressure below said liquefaction pressure.

6. A process for separating a high molecular mixture into fractions having different properties, comprising the steps of dissolving said mixture in a liquid solvent for said mixture to produce a homogeneous normal liquid solution, dissolving in the resulting liquid solution a quantity of a low molecular gas, under para-critical temperature conditions for said gas, said quantity being sufficient to cause the formation of two liquid phases, the pressure being below the liquefaction pressure of said gas at the temperature of the treatment, said gas being incapable of reacting chemically with the high molecular mixture under the conditions of the treatment, and separating said liquid phases at a pressure below said liquefaction pressure.

7. A process for separating a high molecular mixture into fractions having different properties, comprising the steps of dissolving in said mixture a quantity of a low molecular gas, under para-critical temperature conditions for said gas, said quantity being sufficient to cause the formation of two liquid phases, the pressure being below the liquefaction pressure of said gas at the temperature of the treatment, said gas being incapable of reacting chemically with the high molecular mixture under the conditions of the treatment, and separating said liquid phases at a pressure below said liquefaction pressure.

8. A process for separating a high molecular mixture into fractions having different properties, comprising the steps of dissolving in said mixture a quantity of a low molecular gas, said quantity being sufficient to cause the formation of two liquid phases, the pressure being below the liquefaction pressure of said gas at the temperature of the treatment, said gas being incapable of reacting chemically with the high molecular mixture under the conditions of the treatment, and separating said liquid phases at a pressure below said liquefaction pressure.

9. A process for separating a high molecular mixture into portions having different properties, comprising the steps of dissolving said high molecular mixture in a selective solvent for a component of the mixture, contacting the resulting liquid mixture with a quantity of a low molecular treating agent, which is incapable of reacting chemically with the high molecular mixture and the solvent under the conditions of the treatment, at a temperature above the critical temperature for the said treating agent, said quantity being sufficient to cause the formation of at least two liquid phases having compositions different from the said resulting mixture, and separating said liquid phases from one another at a temperature above said critical temperature.

10. A process for separating a high molecular mixture into portions having different properties, comprising the steps of dissolving said high molecular mixture in a selective solvent for a component of the mixture, contacting the resulting liquid mixture with a quantity of a low molecular treating agent, which is incapable of reacting chemically with the high molecular mixture and the solvent under the conditions of the treatment, under para-critical temperature conditions for the said treating agent, said quantity being sufficient to cause the formation of three simultaneous liquid phases in equilibrium with one another having compositions different from the said resulting mixture, and separating said liquid phases from one another at a paracritical temperature for said treating agent.

11. A process for separating a liquid hydrocarbon oil into oil fractions having different properties, comprising the steps of dissolving said oil in a liquid selective naphthenic solvent, contacting the resulting liquid mixture with a quantity of a low molecular treating agent which is incapable of reacting chemically with the oil and the solvent under the conditions of the treatment, under para-critical temperature conditions for the said treating agent, said quantity being sufficient to cause the formation of three simultaneous liquid oil-containing phases in equilibrium with one another having compositions different from said resulting mixture, and separating said liquid phases from one another at a paracritical temperature for said treating agent.

12. The process according to claim 11 in which the concentration of oil and solvent is such that the said resulting liquid mixture is capable of existing as a substantially homogeneous liquid solution at the temperature of treatment with the gaseous treating agent.

13. The process according to claim 11 in which at least one of the two lighter liquid phases is distilled to remove the low molecular treating agent, the selective solvent, and the more volatile oil components.

14. A process for separating a high molecular mixture into fractions having different properties, comprising the steps of dissolving said mixture in a low boiling aliphatic hydrocarbon which is a normal liquid at the temperature and pressure of the treatment, subjecting the resulting solution to the precipitating action of a quantity of a low molecular treating agent which is incapable of reacting chemically with the high molecular mixture under the conditions of the treatment, at a temperature above the critical temperature for the said treating agent, said quantity being sufficient to cause the formation of two liquid phases containing different portions of the mixture at a temperature above said critical temperature.

15. The process for separating a high molecular mixture into a plurality of fractions having different properties, comprising the steps of dissolving in said mixture in the normal liquid state a quantity of a gaseous low molecular treating agent which is incapable of reacting chemically with the high molecular mixture under the conditions of the treatment, said quantity being sufficient to cause the separation of the mixture into two non-gaseous phases at least one of which is a normal liquid when the treating agent is in a para-critical state, creating in said mixture a condition in which the treating agent is at a para-critical temperature and said mixture is in a normal liquid state, the pressure being below the liquefaction pressure of said treating agent at the temperature of the tretament, to cause the formation of a primary light normal liquid phase and a primary phase of greater density, separating said primary phases under said conditions, dissolving an additional quantity of a low molecular treating agent of the type described above the primary light phase to cause the separation of the primary light liquid phase into secondary liquid phases of different densities, at a temperature at which the low molecular treating agent added to cause the formation of the secondary phases is in a para-critical state, and separating the secondary phases, at a para-critical temperature for said added treating agent.

16. The process for separating a high molecular mixture into a plurality of fractions having different properties, comprising the steps of dissolving in said mixture in the normal liquid state a quantity of a low molecular treating agent which is incapable of reacting chemically with the high molecular mixture under the conditions of the treatment, said quantity being sufficient to cause the separation of the mixture into two non-gaseous phases at least one of which is a normal liquid when the treating agent is in a para-critical state, creating in said mixture a condition in which the treating agent is at a temperature above its critical temperature and said mixture is in a normal liquid state to cause the formation of a primary light normal liquid phase and a primary phase of greater density, separating said primary phases under said conditions, dissolving an additional quantity of a low molecular treating agent of the type described above in the primary light phase without applying heat thereto to cause the separation of the primary light liquid phase into secondary liquid phases of different densities, at a temperature above the critical temperature of the low molecular treating agent added to cause the formation of the secondary phases, and separating the secondary phases at a temperature above said last mentioned critical temperature.

17. The process according to claim 16 in which the temperature at which the high molecular mixture is caused to separate into the primary phases is substantially the same as the temperature at which the primary light phase is caused to separate into the secondary phases.

18. The process according to claim 16 in which the same low molecular treating agent is used to cause the formation of the primary and the secondary phases, and the separation of the mixture into the secondary phases is effected at a higher pressure than that at which the mixture is separated into the primary phases.

STANISLAW PILAT.
MARIAN GODLEWICZ.